United States Patent [19]

Takagi

[11] 4,402,114
[45] Sep. 6, 1983

[54] BUCKLE MECHANISM FOR SEAT BELTS AND METHOD FOR THE PRODUCTION THEREOF

[75] Inventor: Masayuki Takagi, Fujisawa, Japan

[73] Assignee: NSK-Warner K.K., Tokyo, Japan

[21] Appl. No.: 235,684

[22] Filed: Feb. 18, 1981

[30] Foreign Application Priority Data

Feb. 28, 1980 [JP] Japan ................................. 55/24608

[51] Int. Cl.³ ............................................. A44B 17/00
[52] U.S. Cl. .................................. 24/201 R; 24/265 R
[58] Field of Search ............ 24/201 R, 265 R, 211 R; 403/315, 319, 353; 297/468, 483

[56] References Cited

U.S. PATENT DOCUMENTS

| | | | |
|---|---|---|---|
| 919,693 | 4/1909 | Castle | 403/353 |
| 1,803,401 | 5/1931 | Nadeau | 403/315 |
| 4,233,714 | 11/1980 | Panicci | 24/201 R |

Primary Examiner—Hugh R. Chamblee
Attorney, Agent, or Firm—Cantor and Lessler

[57] ABSTRACT

A fastening or buckle mechanism is provided for use in safety seat belts for vehicles and comprises a connector or coupler having vertical grooves on both sides and flattened portions formed by depression of the side walls therebelow, and a buckle base having projections associated with the grooves and including a back plate having therein a hole for reception of the connector. In assembling, a buckle cover is fitted over the buckle base integrated with the connector. To prevent disengagement of the connector, the buckle cover is provided on the rear side with a projection.

1 Claim, 5 Drawing Figures

BUCKLE MECHANISM FOR SEAT BELTS AND METHOD FOR THE PRODUCTION THEREOF

BACKGROUND OF THE INVENTION

The present invention relates to a buckle mechanism adapted for use in seat belts for vehicles and a method for the production of the same.

Recently, passengers are encouraged to use safety seat belts to assure their safety in connection with the fact that the spread of highways leads to a raise in the speed of vehicle traffic thereon. Usually, the passenger puts on tightly a safety seat belt by inserting a tongue mounted on the seat belt into a fastening means provided at one end of a fitting comprising a flexible cable or strap, which has its other end fixedly attached to the floor of the framework of a vehicle. This type of the fastening means referred to a buckle mechanism in the art is disclosed in, e.g., British Pat. No. 1,408,499 and U.S. Pat. No. 4,373,830. So far, such a buckle mechanism has normally been manufactured by caulking the end of the cable with the fitting and rivetting the fitting to a buckle base. However, this manufacturing method is found to involve complicated and troublesome steps.

SUMMARY OF THE INVENTION

It is therefore a main object of the present invention to provide a buckle mechanism which has advantages over the prior art buckles. Another object of the present invention is to provide an improved method for the production of the buckle mechanism.

BRIEF DESCRIPTION OF THE DRAWINGS

Preferred embodiments of the present invention will now be explained by way of a example in the accompanying drawings in which.

DETAILED DESCRIPTION OF THE PREFERRED EMBODIMENTS

Figure 1:
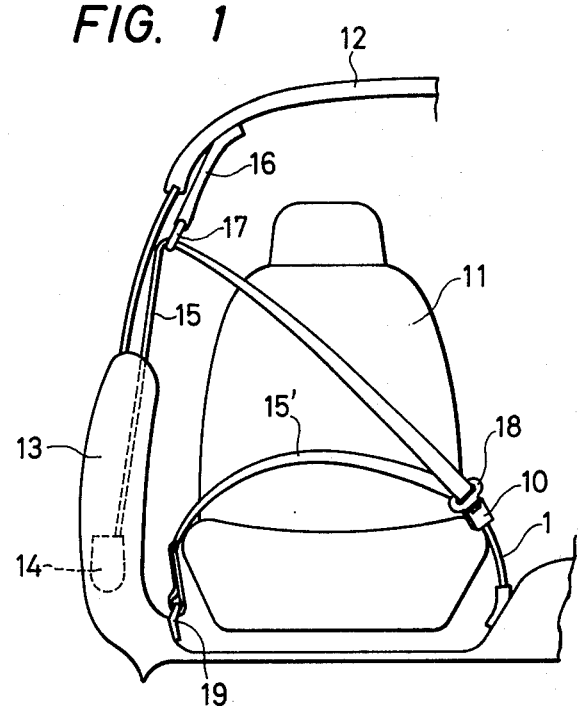
FIG. 1 is a view illustrative of a safety seat belt system.

Referring to the drawings, particularly to FIG. 1, there is shown a seat belt system into which is incorporated a buckle mechanism generally shown at 10. The buckle mechanism 10 is mounted on one end of a flexible cable 1 having its other end secured to a floor of the framework of a vehicle. Reference numerals 11 and 12 stand for a seat and the roof of the vehicle, respectively. As a webbing 15 is drawn out of a retractor 14 disposed in the interior of the framework 13, it passes through a through-ring 17 of a through-belt 16 mounted on the roof 12 and a tongue 18 provided halfway, and is fixed to the framework by means of a mounting means 19 placed on the floor.

In use, the webbing is brought about the occupant's body by insertion of the tongue 18 into the buckle mechanism 10. While the seat belt illustrated is of a so-called three-point seat belt system wherein the upper and lower halves of the occupant are simultaneously held in place, it should be understood that a so-called two-point seat belt system comprising only a webbing portion shown at 15', which is designed to hold only the lower half of the occupant in place, is also used in a similar manner, i.e., by insertion of the tongue 18 provided at the end of the webbing into the buckle mechanism 10.

The present invention is concerned with a method of the production of the buckle mechanism 10 as well.

Figure 2:
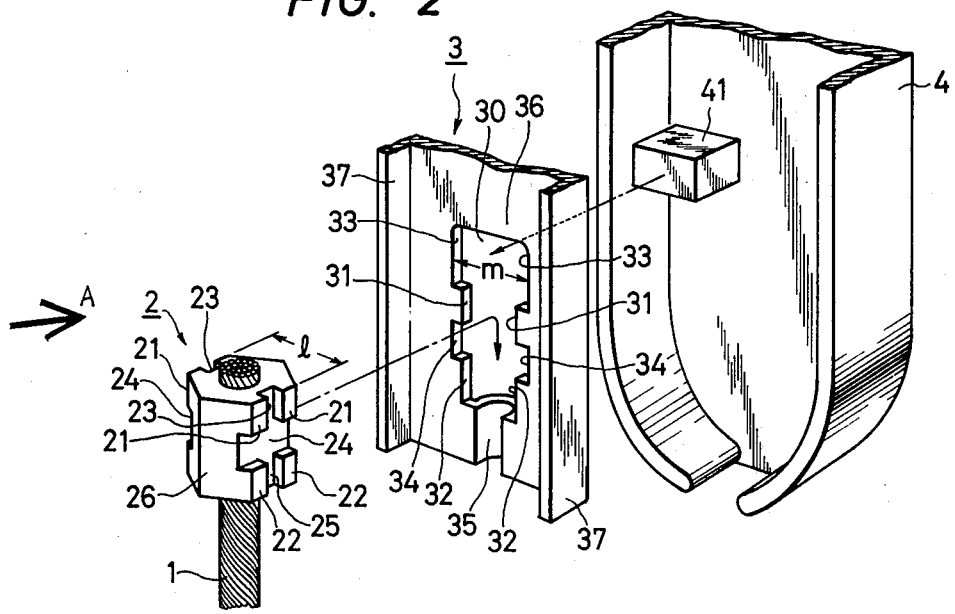
FIG. 2 is a perspective view showing a buckle mechanism with the parts separated.
Figure 3:
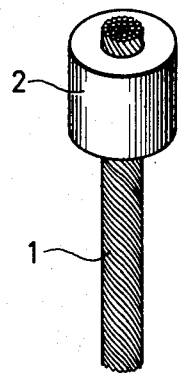
FIG. 3 is a view indicative of a cable provided with a coupler.

In FIG. 2, the buckle mechanism 10 is illustrated with the parts separated. As illustrated, the buckle mechanism 10 comprises a flexible cable 1, a connector or coupler 2 secured to the end thereof, a buckle base 3 including a back plate 36 having therein a hole 30, and a buckle cover 4. In manufacturing the buckle mechanism, the connector 2 in the form of a cylinder or the like is first squeezed into the end of the flexible cable, as shown in FIG. 3. The connector 2 is then subjected to pressing (embossing) at both sides, so that a vertical groove 23 is squeezed between the upper flat faces 21 and 21 at both sides of the connector 2, as seen from FIG. 2. Both walls of the groove 23 are depressed at its lower central portion to form a flattened portion 24. In a similar way, a vertical groove 25 is formed between the lower right and left flat faces 22 and 22. Since the connector 2 is thus subjected to pressing from the right and left sides, it is tightly held over the flexible cable so that the cable swells in the direction of a portion shown at 26.

The buckle base 3, to which the connector 2 is to be attached, comprises a back plate 36 and plates 37, 37 provided on either side thereof, said back plate being provided therein with a hole 30 through which the connector is attached. The hole 30 has projections 31, 31 and similar projections 32, 32 at its lower end. Below the hole 30 there is a semi-circular portion 35 for reception of the flexible cable 1. The dimension of the projections 32, 31 may be substantially equal to or slightly larger than the depth of the vertical grooves 23, 25, as depicted in FIG. 2. The width m of the hole 30, i.e., the interval between the right and left walls 33 above the projections 31 or between the walls 34 and 34 located between the projections 31 and 32 is slightly smaller than the distance (shown by l in FIG. 2) between the connector face 21 and the opposite face. The width of the vertical grooves 23 or 25 is substantially equal to the thickness of the back plate 36 forming a part of the buckle base.

In order to assemble the connector 2 to the buckle base 3, the connector 2 is first inserted at its upper flat faces 21 between the walls 33 and 33 of the hole 30 formed in the buckle base 3. The connector 2 is then inserted at the flattened portion 24 and the flat faces 22 between the projections 31 and 31 and between the walls 34 and 34, respectively, so that the vertical groove 23 or 25 is located on the projections 31 or 32. The flexible cable 1 is placed in the semi-circular portion 35. Upon application of a pull to the connector 2 in the downward direction in the drawing (i.e., in the direction of the semi-circular portion 35), the vertical grooves 23 and 25 take abutment onto the projections 31 and 32, so that the connector 2 is secured to the buckle base 3. Fitting of the buckle cover 4 over the buckle base 3 then results in accomplishment of the buckle mechanism 10. As depicted in FIG. 2, the buckle cover 4 is provided on its rear side with a projection 41 for preventing disengagement of the connector or the like. The connector 2 is also designed such that, upon attachment of the connector 2 to the buckle base 3, it is guided downwardly so that the vertical groove 23 takes abutment onto the projections 31. As a result, there is left a space or room above the projections 31 of the hole 30. Where the buckle cover 4 is fitted over the buckle base 3, the projection 41 is in fitting engagement with the space to assure prevention of disengagement of the connector or the like. The arrow indicated in FIG. 2 by a two-dot chain line shows the direction along which the connector 2 or the projection 41 is inserted into the buckle base 3. As mentioned above, the arrow indicates that the connector 2 is guided downwardly after it has been placed into the hole 30.

Figure 4:
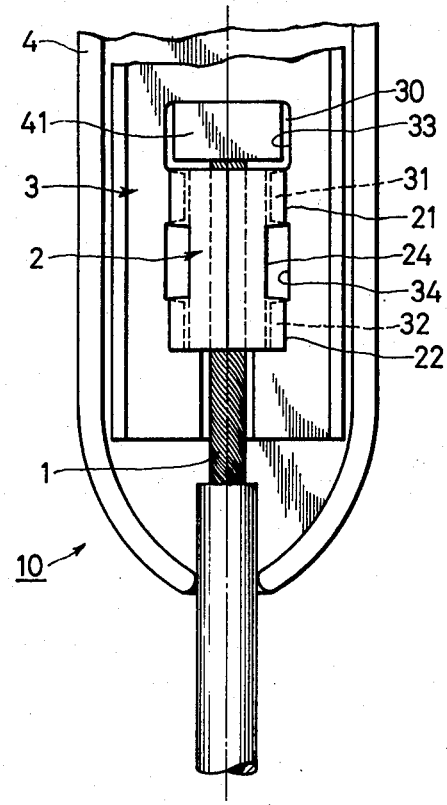
FIG. 4 is an illustration as viewed in the direction of an arrow A in FIG. 2.

FIG. 4 is an illustration of the thus finished buckle mechanism 10 as viewed in the direction of the arrow A in FIG. 2. The projection 41 is fitted between the upper walls 33 and 33 of the hole 30. As illustrated, the connector 2 is guided downwardly, so that the vertical groove 23 takes abutment onto the projections 31, thus causing the flat faces 21 to be located on both sides of the projections 31. Similarly, the lower flat faces 22 are located on both sides of the lower projections 32. The flattened portion 24 faces the hole walls 34.

Figure 5:
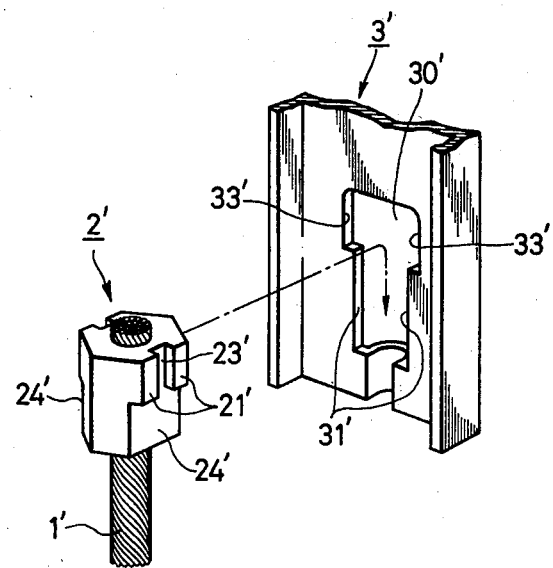
FIG. 5 is a view of a modification.

FIG. 5 shows a modification of the junction of the connector and the buckle base. A connector 2' is pressed at both sides so that a vertical groove 23' is formed in either side between flat faces 21' and 21'. Below the groove, there is formed a flattened portion 24'. A hole 30' in an associated buckle base 3' is provided only at its lower portion with projections 31'. To assemble the connector to the buckle base, like the FIG. 2 embodiment, the flat faces 21' and 21' are interposed between the upper sides 33' and 33' of the hole 30', so that the vertical groove 23' is positioned on the projections 31, as shown by a two-dot chain line. Upon application of a downward pull to the connector 2', the vertical groove 23' takes abutment onto the projections 31', so that the connector 2' is secured to the buckle base 3'.

While the invention has been described with reference to the embodiments wherein the projection for preventing disengagement of the connector or the like is provided to the rear side of the buckle cover, it will be understood that the prevention of disengagement of the connector or the like is accomplished by a separate packing fixedly filled in the upper part of the hole with no need of any projection.

According to the present invention, it is possible to manufacture inexpensively a number of buckle mechanism in an automated system that requires no mechanical processing. Assembling of the buckle mechanisms are also accomplished without recourse to caulking or other laborious steps.

What is claimed is:

1. A buckle mechanism adapted for use in safety belts for vehicles comprising:
   (a) A cable;
   (B) a connector crimped onto said cable and having at least two opposed sides,
      (1) a longitudinal groove formed in each said side coaxial with the axis of said cable, and
      (2) a flattened portion on each said side extending in a latitudinal direction with respect to said grooves;
   (C) a buckle base having a back plate, said back plate being provided therein with an opening, both sides of said opening being defined by opposed side walls having a pair of opposed projections adapted to coact with said grooves; and
   (D) a buckle cover capable of being coupled with said cable or connector, and having a projection adapted to be positioned inside said opening; and wherein
   (E) application of a pull to said connector through said cable in a longitudinal direction from the place where said grooves stand opposite to said side walls of said buckle base permits the engagement of said grooves with said projections and secures said connector to said buckle base; and
   (F) movement of said connector toward the disengaging direction is prevented by said projection of said buckle cover.

* * * * *